Aug. 4, 1953

E. PARKER ET AL 2,648,061

CATHODE-RAY TUBE DISPLAY SYSTEM

Filed Dec. 29, 1947

Aug. 4, 1953  E. PARKER ET AL  2,648,061
CATHODE-RAY TUBE DISPLAY SYSTEM
Filed Dec. 29, 1947  7 Sheets-Sheet 2

INVENTORS
E. PARKER
P. R. WALLIS
A. WORONCOW
BY Kenyon & Kenyon
THEIR ATTORNEYS

Fig. 7.

Aug. 4, 1953  E. PARKER ET AL  2,648,061
CATHODE-RAY TUBE DISPLAY SYSTEM
Filed Dec. 29, 1947  7 Sheets-Sheet 4

INVENTORS
E. PARKER
P.R. WALLIS
A. WORONCOW
BY Kenyon & Kenyon
THEIR ATTORNEYS

Aug. 4, 1953  E. PARKER ET AL  2,648,061
CATHODE-RAY TUBE DISPLAY SYSTEM
Filed Dec. 29, 1947  7 Sheets-Sheet 5

INVENTORS
E. PARKER
P.R. WALLIS
A. WORONCOW

BY Kenyon + Kenyon
THEIR ATTORNEYS

Aug. 4, 1953    E. PARKER ET AL    2,648,061
CATHODE-RAY TUBE DISPLAY SYSTEM
Filed Dec. 29, 1947    7 Sheets-Sheet 7

INVENTORS
E. PARKER
P. R. WALLIS
A. WORONCOW
BY Kenyon + Kenyon
THEIR ATTORNEYS

Patented Aug. 4, 1953

2,648,061

UNITED STATES PATENT OFFICE 2,648,061

CATHODE-RAY TUBE DISPLAY SYSTEM

Eric Parker, Peter R. Wallis, and Alexander Woroncow, Haslemere, England, assignors to National Research Development Corporation, London, England, a corporation of Great Britain and Northern Ireland Application December 29, 1947, Serial No. 794,208
In Great Britain March 30, 1946

Section 1, Public Law 690, August 8, 1946
Patent expires March 30, 1966

25 Claims. (Cl. 343—7.9)

This invention is for improvements in and relating to cathode ray tube display systems and has for its main object to provide apparatus for the three-dimensional display of positional, numerical, or like data on the uniplanar luminescent screen of a cathode ray tube.

A cathode ray tube display system according to the invention comprises a cathode ray tube, control circuits for applying to the cathode ray tube three independent time-base voltages for deflecting the electron beam so as to trace on the luminescent screen a representation of three mutually perpendicular coordinates, and means for intensity modulating the electron beam in accordance with the instantaneous values of any of three variable quantities represented by the coordinates. In one form of the invention means are provided for varying the relative positions of the representation on the luminescent screen of the three mutually perpendicular coordinates.

In order that the invention may be more readily understood examples thereof will now be described with reference to Figures 1 to 23 of the accompanying drawings, which for convenience are related to a radar system in which a beam of pulse-modulated radio-frequency radiation is caused to scan in azimuth and in elevation and "echo" signals reflected or re-radiated by objects illuminated by the beam are displayed by intensity modulation on the screen of the cathode ray tube in such a manner as to represent simultaneously the coordinates of the positions of the objects, namely, bearing position, elevation position, and range. In the drawings:

Figures 3, 4, 7(a)–7(m), 8A, 8B, and 23 are diagrams used for explaining the manner of operation of the invention.

Figure 1:
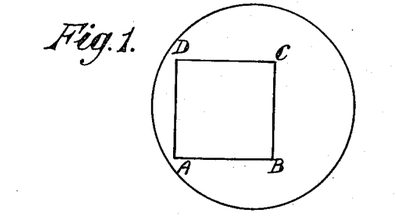
Figures 1, 5, 6, 9, 10, 15, 19, 20, 21, and 22 show typical examples of the display obtained with the use of the invention.

The radar aerial system is assumed to be scanning simultaneously in azimuth and in elevation through a selected angle and the operator is assumed to be interested in a cube of space bounded by the selected angles of scanning in azimuth and in elevation and by a selected minimum and maximum range from the aerial system. As will be shown hereinafter it is possible according to the invention to apply deflecting voltages to the cathode ray tube in such a manner that the electron beam traces on the luminescent screen a representation of the projection, on a plane surface, of a cube illuminated by a parallel beam on which representation the three coordinates correspond to bearing, elevation and range. If, in known manner, two time-base voltages are fed respectively to the X- and Y-plates of an electrostatically deflected cathode ray tube, that applied to the X-plates representing the azimuth scan and that applied to the Y-plates representing the elevation scan, then a trace bounded by a square ABCD, as shown in Figure 1, will be produced on the screen and will comprise a series of curves traversing the square. If, now, the electron beam is intensity modulated when an "echo" signal is received, a bright spot will appear within the square having coordinates representing the position of the "echo" signal in bearing and in elevation, but it is not possible to determine the position in space of the "echo" signal unless means are also provided for recording the range thereof. According to the invention, therefore, a third coordinate representing the range is applied to the cathode ray tube so that the trace reproduced on the luminescent screen appears to be a cube which corresponds to the projection, on a plane surface, of the cube of space when illuminated by a parallel beam, and means are provided for so orientating the apparent cube on the luminescent screen as to represent the projection of the cube of space when illuminated by a parallel beam from any desired direction so that any face of the cube may be examined independently of the other faces.

Figure 2:
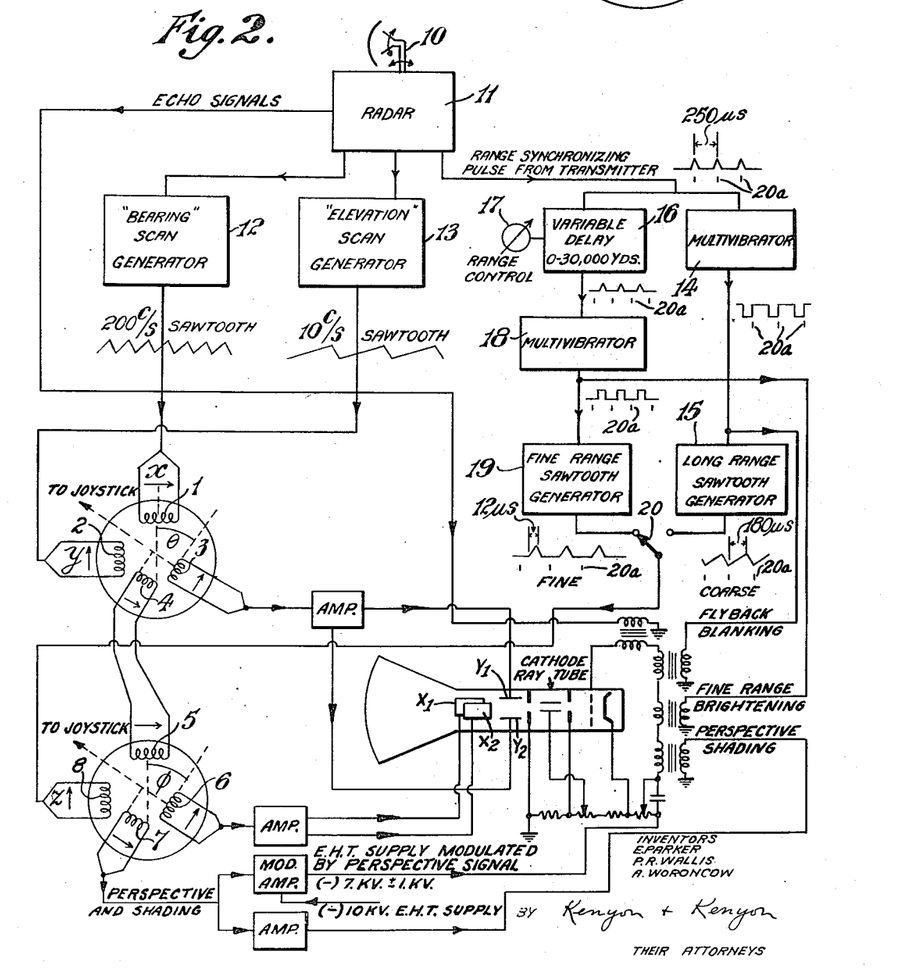
Figures 2, 11, 12, 13, 14, 16, and 18 are circuit diagrams of the control circuits used for producing the displays.

One way of carrying the invention into effect is shown diagrammatically in Figure 2 in which time-base voltages $x$, $y$ corresponding to the scanning of the aerial in bearing and elevation are applied in the directions shown by arrows to two fixed mutually perpendicular coils 1, 2 of a variocoupler which acts as a resolving device. The variocoupler may for convenience comprise the field and search coil assembly of a radio-goniometer such as is used in radio direction finders. The moving coil system of the variocoupler comprises two mutually perpendicular coils 3 and 4, coil 3 being directly connected to the Y-plates of an electrostatically deflected cathode ray tube and coil 4 being connected to the X-plates of the tube through a second variocoupler whose function will be hereinafter described.

Figure 3:
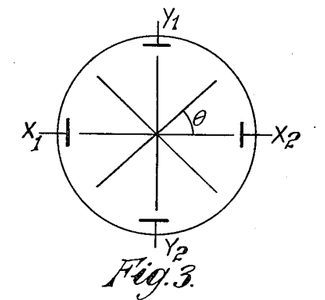
Figure 4:
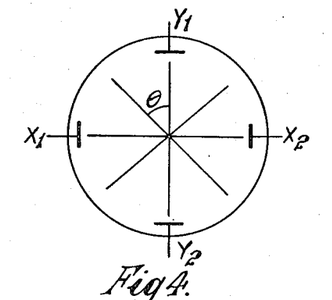
Figure 5:
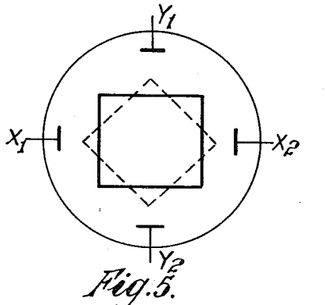

It will be assumed initially, for the purpose of simplification of the explanation, that the second variocoupler is omitted and that the output from coil 4 is applied directly to the X-plates of the tube. If a scanning voltage, say of saw-tooth waveform having a frequency of 200 cycles per second, is applied to the fixed coil 1 of the variocoupler, there being no voltage applied to the fixed coil 2, and moving coil 3 is parallel to the fixed coil 1, then the electron beam will be deflected so as to produce a line between the Y-plates of the cathode ray tube, there being no voltage applied to the X-plates through the coil 4. If, however, the moving coils 3 and 4 are together rotated relatively to the fixed coils 1 and 2, then at any instant the Y-plates will receive a voltage $x \sin \theta$ and the X-plates will receive a voltage $x \cos \theta$, where $(90°-\theta)$ is the angle between the fixed coil 1 and the moving coil 3. As a result, the electron beam will produce at any instant a straight line at an angle $(90°-\theta)$ to the Y axis of the tube and continuous rotation of the coils 3 and 4 will produce a series of straight lines as shown in Figure 3. If now, the scanning voltage $x$ is ignored and the scanning voltage $y$, representing the elevation scan and being, for example, a saw-tooth waveform having a frequency of 10 cycles per second, is applied to fixed coil 2 of the variocoupler, a voltage $y \cos \theta$ will be applied at any instant to the Y-plates through the coil 3 and a voltage $-y \sin \theta$ will be applied to the X-plates through the coil 4, and a series of straight lines at an angle $(90°-\theta)$ to the X-axis will be produced on the screen of the tube as the coils 3 and 4 are rotated, as shown in Figure 4. Thus when both the $x$ and $y$ scanning voltages are applied simultaneously to the variocoupler a trace bounded by a square will be produced on the screen of the tube as shown in the full lines in Figure 5, representing the case when the coil 3 is parallel to coil 1, coil 4 then being parallel to coil 2, and the square trace will rotate on the face of the tube as shown in dotted lines in Figure 5 when the coils 3 and 4 are rotated in the variocoupler, the Y-plates receiving at any instant a voltage $(x \sin \theta + y \cos \theta)$ and the X-plates receiving a voltage $(x \cos \theta - y \sin \theta)$.

As stated above, the output from the moving coil 4 is actually applied to the X-plates through a second variocoupler, the output $$(x \cos \theta - y \sin \theta)$$

being applied in the direction shown by an arrow to a fixed coil 5 of this second variocoupler and a movable coil 6 of the variocoupler being connected to the X-plates. If the movable coil 6 is rotated relatively to the fixed coil 5, the voltage applied to the X-plates will vary as the angle $(90°-\phi)$ between the moving coil 6 and the fixed coil 5 is varied and will be represented by $$[(x \cos \theta - y \sin \theta) \sin \phi]$$

with the result that the voltage applied to the X-plates can be varied between zero and a maximum as the coil 6 is rotated. Thus the square trace shown on the screen can be reduced in size in the direction of the X-plates so that the square can be varied between a straight line extending between the Y-plates through a rectangle to the full square when $\phi=90°$ or between a straight line and the corresponding figure when $\phi<90°$.

Figure 6:
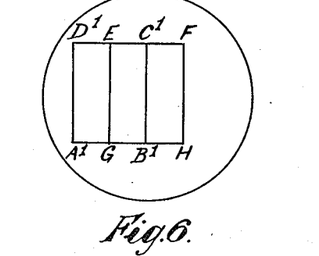
Figure 7:
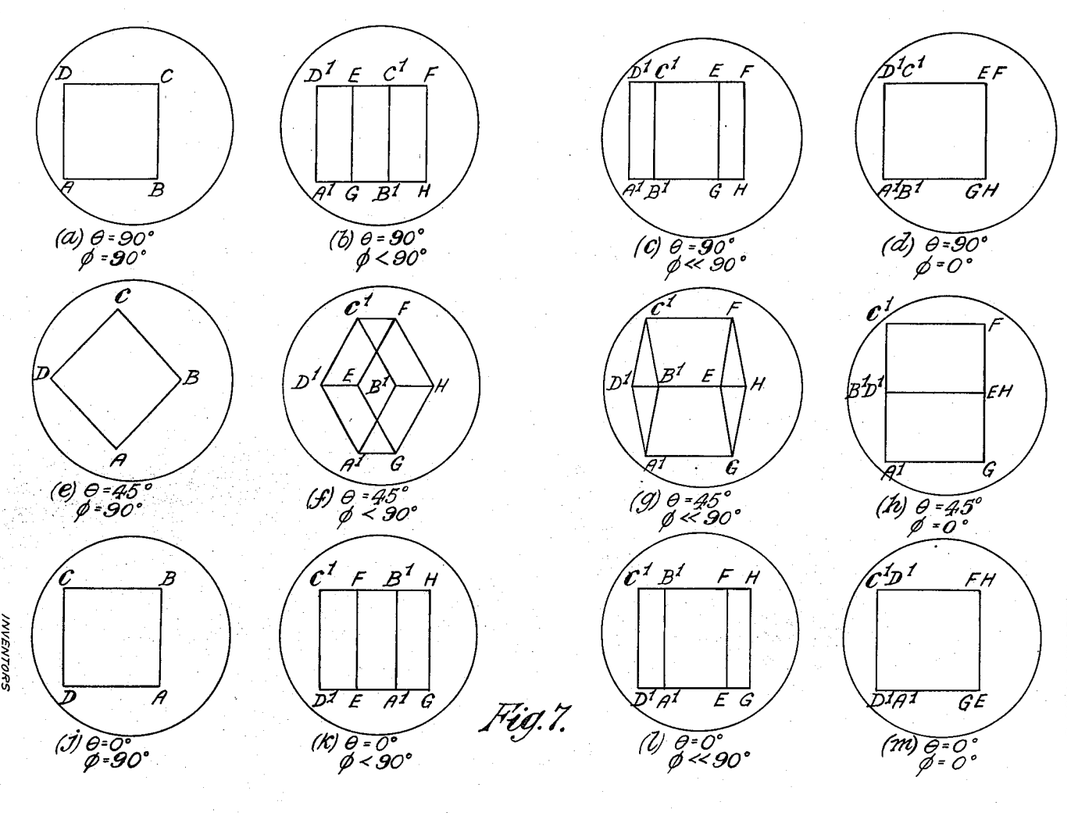

The second variocoupler is also provided with a second fixed coil 8 mounted perpendicularly to the first fixed coil 5 and a scanning voltage $z$ is applied thereto in the direction shown by an arrow so as to represent the range scan of the cube of space referred to above. This scanning voltage $z$ may be, for example, a saw-tooth waveform having a frequency of 4,000 cycles per second. It will be seen that the output applied to the X-plates of the tube will become $$[(x \cos \theta - y \sin \theta) \sin \phi + z \cos \phi]$$

and that the effect of the application of the scanning voltage $z$ is to cause an apparent shift of the rectangle shown in Figure 5 along the X-axis of the tube for a distance corresponding to the amplitude at any instant of the voltage $z$, namely, $z \cos \phi$. Thus, with the coils 3 and 4 parallel respectively to the coils 1 and 2 the square as shown at ABCD in Figure 1 is produced; as shown in Figure 6 this square is converted into a rectangle A'B'C'D' when coil 6 is moved so as to make angle $\phi>0$; and the rectangle A'B'C'D' is in turn converted into the projection of a cube bounded by the two rectangles, A'B'C'D', GEFH by the application of the scanning voltage $z$ to fixed coil 8, the length along the X-axis of the line B'H being determined by the angle $\phi$. Furthermore, it will be seen that if the coils 3 and 4 are rotated, the apparent cube so formed is rotated in the plane of the screen of the tube and that by rotation of the coil 6 the width of the figure A'B'C'D' in the line of the X-plates can be reduced to zero and at the same time the length of the line B'H increased, giving the apparent effect of rotation of the cube about the Y axis of the tube as would result from illumination of the cube of space from different directions. Figures 7 (a) through 7 (m) show a series of representations produced by various increases in $\theta$ and $\phi$.

The time base voltages $x$, $y$ and $z$ for application to the variocouplers of Figure 2 can be derived from a radar installation in the manner illustrated diagrammatically in that figure. The movements of the aerial 10 of the radar 11 control the "bearing" scan generator 12 and "elevation" scan generator 13, the former producing a saw-tooth scanning voltage of 200 cycles per second which is fed to the coil 1 of the first variocoupler as the voltage $x$, whilst the elevation scan generator gives an output of 10 cycles per second saw-tooth voltage, which is applied to fixed coil 2 of the first variocoupler as the voltage $y$. A range synchronising pulse is also derived from the transmitter of the radar 11 and this synchronising pulse controls directly a multivibrator 14 which in turn controls the long or coarse range saw-tooth generator 15, giving a saw-tooth voltage output with a duration of 180 microseconds between each flyback. The synchronising pulse from the transmitter (which is shown diagrammatically) is also fed through a variable delay device 16, which is controlled by a range control 17, variable to correspond with any distance up to 30,000 yards, and the output from this variable delay element 16 (having a voltage waveform as represented) is used to control a multivibrator 18 which in turn energises a fine range saw-tooth generator 19, producing a saw-tooth with a duration of 12 microseconds. The timing marks 20a below the representation of the synchronising pulses are repeated on the subsequent waveforms to indicate the time relationship of the multivibrator pulses and the fine range saw-tooth voltages. The output from either the fine range generator or the coarse range generator can be selected by a range switch 20 and passed to the fixed coil 8 of the second variocoupler to provide the voltage $z$. Outputs from each of the multivibrators are taken to the CRT (cathode ray tube) to provide in one case blanking pulses for flyback suppression and in the other case brightening pulses for intensifying the fine range indications as shown.

Figure 8A:
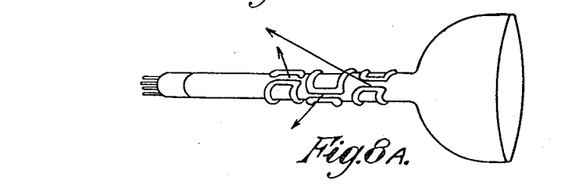
Figure 8B:
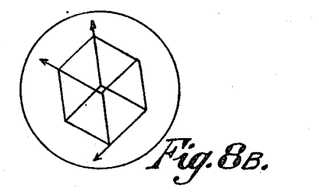

In effect the voltages which are applied to the X- and Y-plates of the tube are trigonometrical functions of the direction of projection. These functions are simply related to direction co-sines between the coordinates of scanning and co-ordinates in the direction of and at right angles to the direction of projection. The variocouplers described with reference to Figure 2 provide correct scanning signals for the cube in all directions of projection and permit the apparent rotation of the cube, and it will be appreciated that various resolver units such as radio-goniometers, phase-shifting transformers, magslips, or sine/co-sine potential dividers would produce the desired result. In some cases it may be convenient to employ a cathode ray tube in which independent means are provided for deflecting the electron beam in three directions. For example, with the electromagnetically deflected tube shown in Figures 8A and 8B (8B showing the viewing face of the tube of 8A) three independent deflection coils are shown and only one of the reference scanning voltages feeds each coil. However, although for the rotation of the cube so produced the need for resolver units would be obviated, it would be necessary to alter the direction and amplitude of deflection of at least two of the deflecting coils.

Figure 9:
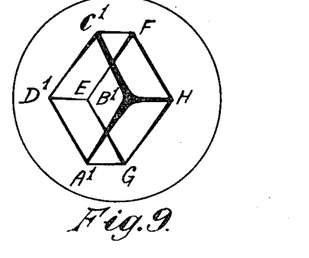

If Figure 7(f) is examined carefully and attention is focussed firstly on the corner B' and secondly on the corner E of the cube, ambiguity will be noted because the corners B' and E appear sometimes to be inner corners and sometimes to be outer corners of the cube. This ambiguity may be overcome by increasing the brilliance of the "nearer" portion of the cube, namely, the corner B'. The signals necessary for carrying this into effect need to be a combination of the three scanning voltages with appropriate trigonometrical co-efficients of the direction of projection which, of course, vary as the cube is rotated, and in the arrangement shown in Figure 2 these signals may be derived directly without the addition of further resolver units by employing a second moveable winding 7 in quadrature to the moveable winding 6 on the second variocoupler. The output from the moveable coil 7 will be $[(x \cos \theta - y \sin \theta) \cos \phi - z \sin \phi]$, and this voltage if fed to the brilliance control of the cathode ray tube will cause the "nearer" part of the cube to be painted most brilliantly with the intensity decreasing towards the "rear" of the cube, as shown diagrammatically in Figure 9 by the difference in weight of the lines.

Figure 10:
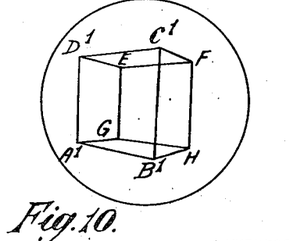

An alternative method of removing the ambiguity is shown diagrammatically in Figure 10, in which the voltages applied to the tube are so modified as to introduce perspective into the representation of the cube, as shown in Figure 7(b), so that the face GEFH is displayed smaller than the face A'B'C'D' and the line A'D' is displayed smaller than the line B'C', and this will in fact make the displayed cube identical in appearance to the cube of space when viewed from any selected viewpoint corresponding to illumination of the cube of space from a point source instead of by a parallel beam. This distortion of the projected image necessitates the variation of the amplitudes of all the scanning voltages as the apparent depth of the scanning point varies and this can conveniently be achieved by modulating the sensitivity control of the tube by a suitably compounded signal.

It can be shown that the sensitivity has to be multiplied by the factor:

$$1 + \frac{1}{\left(\frac{lx+my+nz}{d}\right)}$$

where $d$ is the distance of the hypothetical viewpoint from the centre of the cube, and $x$, $y$, and $z$ are the actual normal scanning coordinates (bearing, elevation, and range, respectively) of the cube in directions which have direction cosines $l$, $m$, and $n$ respectively with the line joining the centre of the cube and the viewpoint. $l$, $m$, and $n$ are similar to the trigonometrical factors referred to above for obtaining the cube presentation, and resolver units are similarly needed to obtain them. If the tube is electrostatically deflected, in which case sensitivity is inversely proportional to accelerating voltage, then the variation can be obtained by modulating the accelerating voltage of the tube in proportion to $$\left[1 + \left(\frac{lx+my+nz}{d}\right)\right]$$

but for magnetic deflection the accelerating voltage will need modulation by $$\left[1 + \left(\frac{lx+my+nz}{d}\right)\right]^2$$

In practice very little error will be introduced by ignoring the square if the distance $d$ is appreciably greater than the actual scanning amplitudes $x$, $y$, and $z$. Referring again to Figure 2 it will be seen that the output from the moving coil 7 would produce the desired effect if applied to the sensitivity control of the tube instead of to the brilliance control as described with reference to Figure 9 for producing "shading."

Figure 11:
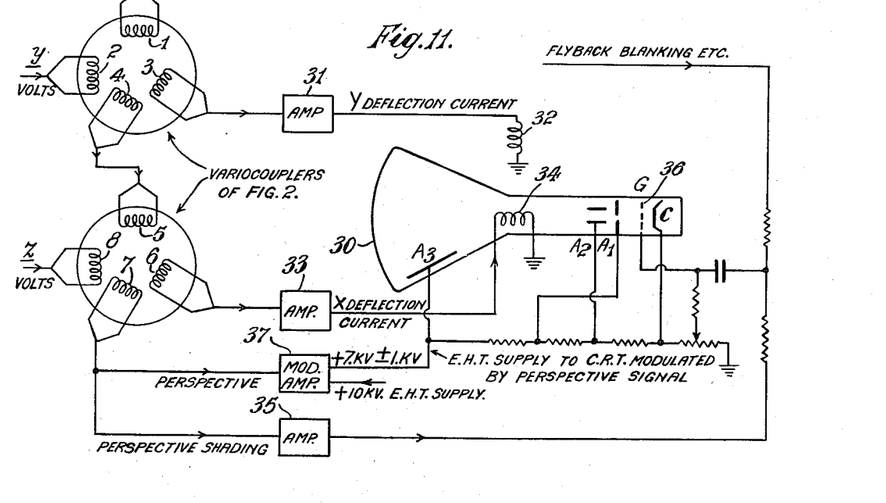

The perspective appearance can be effected by modulating the EHT supply to the cathode ray tube. For example, if the maximum anode voltage on the tube is 7 kilovolts, this could be modulated by ±1 kilovolt to give the necessary perspective. The circuit for a magnetically-deflected tube 30 is illustrated in Figure 11 in which the variocouplers of Figure 2 are represented schematically with inputs of $x$, $y$, and $z$ voltages corresponding to bearing, elevation and range and as derived for example in Figure 2. The Y deflection voltage is fed to an amplifier 31 which gives a scanning current output for feeding the Y deflection coils 32 of the tube 30. Similarly, the X deflection voltage is fed through an amplifier 33 giving a scanning current output for feeding the X deflecting coils 34 of the tube 30. The output from the coil 7 of Figure 2 is amplified and the voltage output from its amplifier 35 can be mixed with a flyback suppression voltage, for instance, and applied to the control grid 36 of the tube 30 as illustrated. The output from coil 7 of the second variocoupler is also fed to an amplifier 37 in which modulation of the tube anode voltage is produced to the degree abovementioned and the modulated output is fed to the usual resistance chain from which tappings are taken to feed the other electrodes in the usual manner. In this way not only is the final anode voltage varied to give the desired perspective appearance but the other electrode voltages are likewise varied correspondingly so as to maintain the appropriate relations between the electrode voltages.

Figure 12:
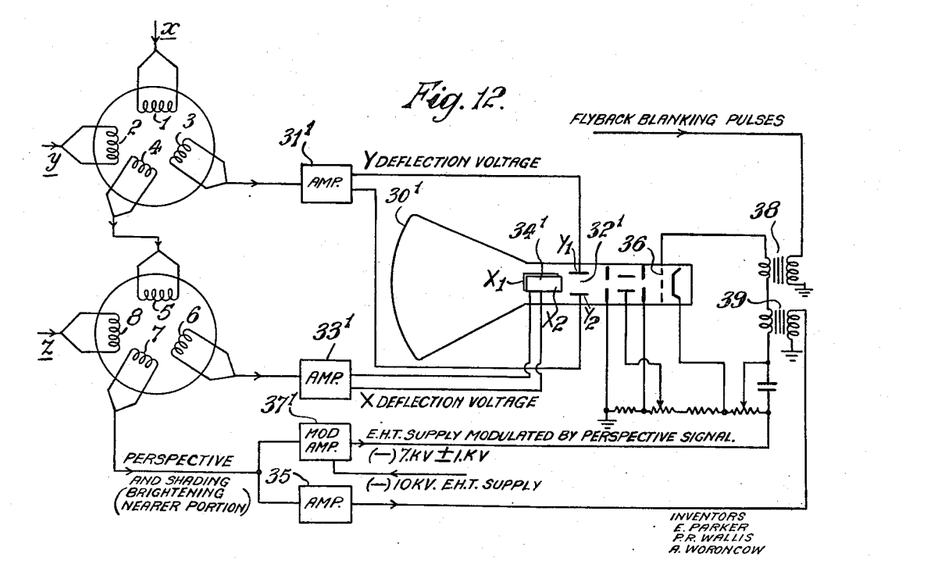

Figure 12 shows a similar circuit for an electrostatically-deflected tube 30', the difference from Figure 11 being that the X and Y deflection amplifiers give a balanced voltage output for application to the deflector plates whilst the EHT supply to the tube is of negative sign since the final anode of the tube is earthed in accordance with usual practice. As a result, the mixing of the flyback suppression pulses with the voltages producing the perspective shading must be done through transformers 38 and 39, connected for example as shown.

In radar systems the aerial array frequently scans in azimuth and in elevation through fixed angles whilst the range information is obtained from the "echo" delay, and if the complete scanned volume of space, from zero to maximum range, is to be displayed with as little distortion as possible, the shape of display required will be a square cone. This can be displayed as a projection on a plane, or more accurately from a desired point of observation by adding perspective, by a similar arrangement to that described above, and means being provided for rotating the axis of the cone around the apex thereof to simulate the alteration in the mean direction of the aerial array. If desired, a truncated section of the cone can be brightened by applying to the tube a shorter range scan timebase triggered later than the main range timebase, and the point of application of the shorter range scan can be applied at any selected instant so as to encompass a selected "echo" trace, the application of the shorter range scan being effected by a simple switch mechanism so that when the shorter range scan is applied, a cube display of the truncated cone so produced is presented on the screen giving in much greater detail the range, bearing and elevation characteristics.

When a considerable movement of the aerial array is required, for example, when there is a rapid elevation scan and a continuous rotation in azimuth, a projection display from a suitable viewpoint of the spacial hemisphere so scanned may be of value as it will give the observer a very clear impression of the relative positions of the objects and the radar apparatus.

In order to obtain a fairly accurate measurement of the position of "echo" signals seen on the display it is advisable to introduce into the display reference spots, lines or surfaces. Thus, by one motion, giving one coordinate, a reference surface can be arranged to intersect a selected "echo" signal trace; by the application of two motions giving two coordinates a reference line can be adjusted to intersect an "echo" signal trace; and, by three coordinates a spot can be brought into coincidence with the "echo" signal trace. Such surfaces, lines or spots can be produced by the brightening of the cathode ray tube spot when it coincides with the desired one, two or three coordinates or by the removal of the scanning in one, two or three directions respectively, leaving a variable direct current voltage applied to the tube. The latter method can only be employed in intervals between radar pictures and must therefore be superimposed on the picture by rapid repetition, for example, by means of a commutator or electronic switch as hereinafter described. The spots, lines and surfaces can be made moveable by means similar to those employed for the movement of strobe markers, in known manner, so that the observer can measure the coordinates by moving the spots, lines or surfaces on to the selected "echo" signal trace by movement of calibrated controls. As an alternative, the reference marks may be fixed with respect to the displayed space and the observer can derive the measurements by swinging the mean position of the aerial and range unit until the "echo" signal trace moves on to a reference mark.

Figure 19:
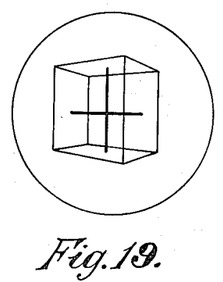
Figure 20:
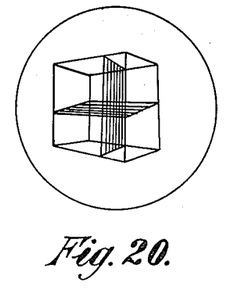

As a further alternative, a three-dimensional grid of spots, lines or surfaces can be superimposed on the display and the position of selected "echo" signal traces estimated by interpolation. Figure 19 shows diagrammatically an example of the use of reference lines superimposed on a cube display and Figure 20 shows an example of the use of reference surfaces on a cube display.

Figure 13:
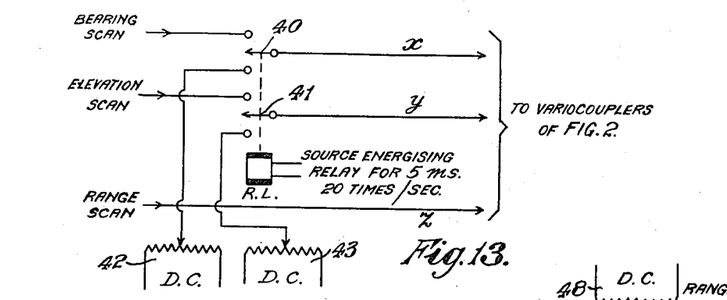

The production of strobe spots or marker planes can be obtained by repeatedly switching the bearing and elevation scan voltages to adjustable sources of steady voltage, for example by relays, as suggested in the Figure 13 which illustrates the production of strobe markers by a commutator arrangement and is a representative case of the production of a marker line in the range direction which can be moved in elevation and bearing to act as an aiming strobe. In this circuit the bearing and elevation scanning voltages are fed through change-over contacts 40—41 of a relay RL before being fed as $x$ and $y$ voltages to the variocouplers of Figure 2 and hence to the display. The range scan voltage is passed on unchanged to the coil 8 of the variocoupler of Figure 2. The relay contacts 40—41 are ganged and the relay is operated from a source which energises the relay say for 5 millisecond periods at a repetition frequency of 20 times per second or any other convenient repetition rate which is not so low as to produce a flickering appearance on the display. When the relay RL is energised the fixed coils 1 and 2 of the first variocoupler (Figure 2) are simultaneously switched to adjustable tappings on two potentiometers 42 and 43 connected across direct current sources.

Figures 14, 15:
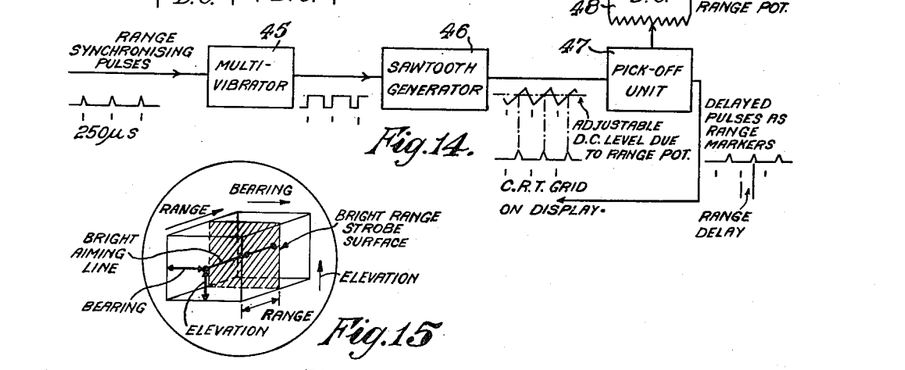

In the case of electronically produced strobe markers (e. g. a range marker plane in the cube display) the arrangement can be as illustrated in Figure 14 which shows diagrammatically the additions to the normal cube display which are required to produce the appearance of a range marker plane. In this case the range synchronising pulses at intervals of 250 microseconds are applied to a multivibrator 45 which produces a square wave output as shown. This output is then passed through a saw-tooth generator 46 where it is converted into a saw-tooth waveform which is then passed into a pick-off unit 47 (see Principles of Radar, The Technology Press [MIT], 1944, particularly pages 13 to 44 of chapter XIII) from which delayed pulses are obtained as range markers and applied to the grid of the CRT on the display. The pick-off unit has applied to it an adjustable D. C. potential from a range potentiometer 48 which causes the range marker pulses to be picked off from the rising slopes of the saw-tooth waveform at voltages corresponding with the setting of the range potentiometer and thus permit an adjustable range delay from the commencement of each stroke of the sawtooth.

As an example of the effect of using both of the arrangements in Figures 13 and 14, Figure 15 shows the appearance of a cube display with a bright aiming line such as could be produced by the commutator arrangement of Figure 13 and a bright range strobe surface or plane such as would be produced by the arrangement of Figure 14.

A single tube can be employed on the screen of which the two slightly different views are presented alternatively by means of a commutator mechanism operating at a repetition frequency slightly greater than that required to produce persistence of visual impression. A revolving shutter arranging alternate images in differently polarised light or different colours will remove the need for an optical system apart from a pair of polarised or coloured glasses to be worn by the observer, but it will be noted that it would not be possible with this method of obtaining stereoscopy for a cathode ray tube having long delay characteristics or persistence to be used.

The polarised light modification mentioned above is illustrated diagrammatically in Figure 18, in which there is shown a cathode ray tube 50 arranged to be viewed through a rotatable polaroid disc 51 consisting of four quadrants of which opposite quadrants pass light polarised in directions corresponding with the circumferential direction of the disc whilst the alternate quadrants pass light polarised in a direction radially of the disc. The operator views the display wearing spectacles 52 such that one eye sees only vertically polarised light and the other eye sees only horizontally polarised light. The shaft 53 of the motor 54 driving the rotating disc carries a four-segment commutator 55 and a slip ring 56 connected in series with a relay coil 57 and a direct current supply for operating the relay. The variocoupler arrangement of Figure 2 feeding the display is duplicated and the mechanical positions of the movable elements of the variocouplers are made to suit the aspect of the cube desired and the normal eye separation distance and the viewing distance. The outputs from the duplicated variocouplers are switched by the relay contacts 58—59 so that a display suited to viewing by the operator's right-eye is visible when the horizontally polarised light is passed by the disc whilst the other display suitable for viewing by the left-eye is visible when vertically polarised light is passed by the rotating disc. The number of alternate disc sections of different polarisations can be increased and the number of commutator segments correspondingly increased so that the rotating disc can be built up of a plurality of narrow sectors of which alternate sectors pass polarisations tangential to the circumference of the disc whilst the alternate sectors pass light polarised at right angles to the aforesaid tangential polarisations if desired to avoid any "flicker" effect.

Figure 18:
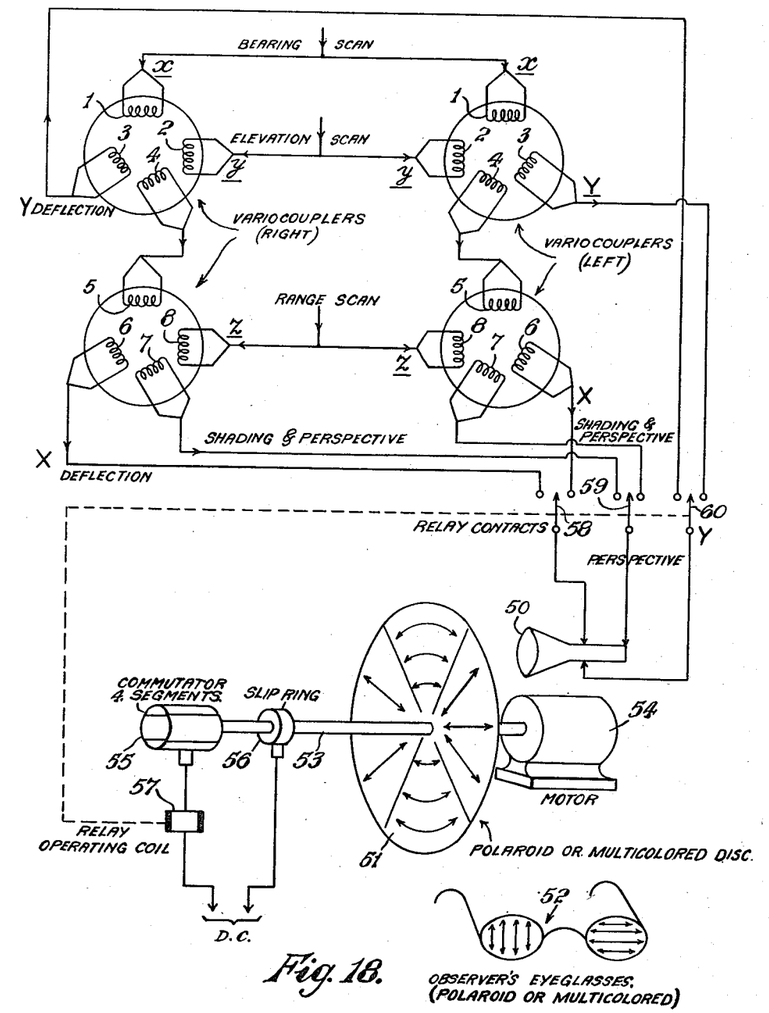

In a similar way to that shown in the lower part of Figure 18 but with two different color filters substituted for the differently polarized sectors and two different corresponding color lenses substituted for the differently polarized lenses of the operator's spectacles, the color modification mentioned above is produced. The remainder of the mechanism is the same and the operation is the same as that when polarized light is used.

In all of the three-dimensional displays described above it will be seen that the sensation of "depth" can be appreciated by the eye because of the parallax effect between two or more "echo" signal traces produced by rotation of the cube, and if the control mechanism by means of which the cube is rotated is directly coupled by means of a "joystick" to the observer's head, it will be possible to turn the image slightly to the left or to the right by a slight inclination of the observer's head so that rotation of the cube equal to the alteration of the viewing angle caused by inclination of the head would give the observer a very real impression of the solidarity of the cube display. Alternatively, a hand-operated "joystick" control for effecting turning can be employed and this may take the form of a model cube counted on a universal joint so arranged that the displayed image will appear to turn in synchronism with the rotation of the model cube. If desired, gearing may be introduced so that the cube rotates through a greater angle than the rotation of the joystick. Furthermore, it can be arranged that deflection of the joystick in a given direction, whether produced by hand or by the observer's head, will produce a sustained rotation of the displayed cube as if the observer's hand or head motion were continued.

Figure 21:
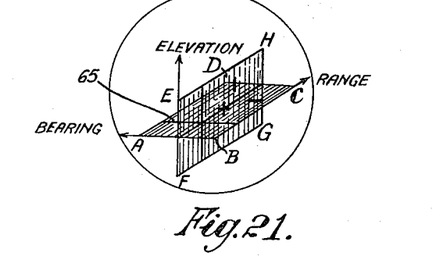
Figure 22:
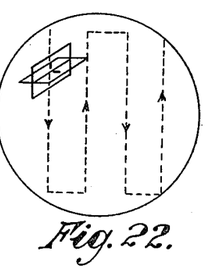
Figure 23:
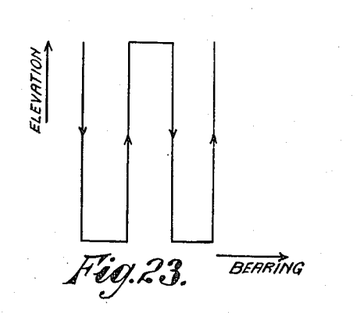

A simple form of display is obtained if the cathode ray tube is arranged to plot two obliquely viewed displays of bearing against range and elevation against range respectively, with the result that a composite oblique cruciform display is produced and a target is always indicated in the plane of each display. Such an arrangement is shown in Figure 21 in which the bearing-range display is marked A, B, C, D and the elevation-range display is marked E, F, G, H. A target illuminated by the radar beam will be indicated as a short vertical line in the plane E, F, G, H and a short horizontal line in the plane A, B, C, D if the target is not on the centre line of the radar beam, whilst any target which happens to be on the centre line appears on the display as a cross. To measure the range of the target a ranging marker 65 consisting of electrical cross-wires may be moved by means of a calibrated control along the two displayed planes. Each plane has, it is seen, one common co-ordinate (the "range" co-ordinate) produced by a linear scan in synchronism with the radar pulse transmission. A bright range marker cross can therefore be produced on the display as shown in Figure 21 if a short brightening pulse is supplied to the CRT cathode (in addition to the signal) a suitable time interval after the radar pulse transmission. Control of this interval will control the position of the marker, and if the marker is moved into coincidence with the echo, the position of the calibrated control will indicate the range. The necessary circuit to produce the brightening pulse after a controllable delay can be similar to the circuit of Fig. 14. Whilst it is possible with a fixed scanning aerial to measure from the display the bearing and elevation of a target by measurement of the positions of the associated vertical and horizontal indicating lines, it is preferable in most cases to move the radar aerial in such a manner that the target under consideration is aligned with the centre line of the aerial, in which case the short vertical and horizontal indicating lines combine to form a cross on the centre line of the display, the movement of the aerial being a direct measure of the departure of the elevation and bearing of the target from a predetermined position. In practice it may be desirable for the display shown in Figure 21 to cover only a small part of the screen and to be movable by means of a "joystick" control up, down, and across the screen in accordance with the movement in elevation and azimuth of the scanning aerial so that as the scanning aerial is moved so as to traverse a given field, the display moves about the screen, and objects can always be made to appear in the display as crosses on the centre line by movement of the scanning aerial. Thus, in a search receiver the scanning aerial may be made to traverse a path such as shown in Figure 23 and at the same time the display traverses a similar path on the screen of the cathode ray tube as shown in Figure 22.

Figures 16, 17:
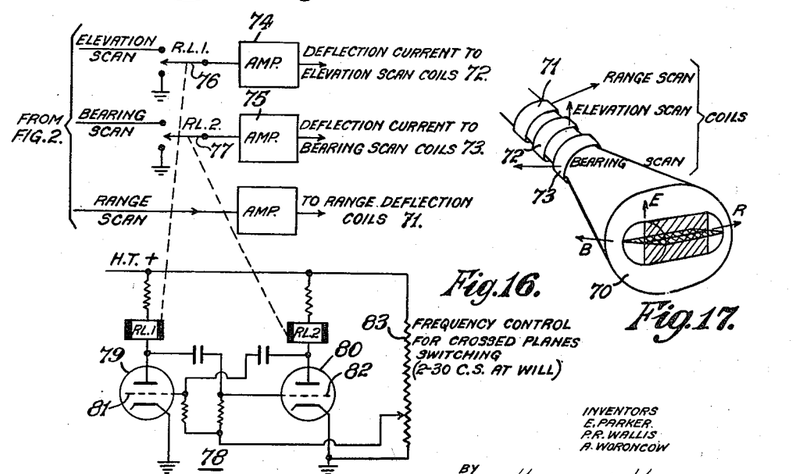

The circuit for producing the display of Figure 25 is shown in Figures 16 and 17. There is illustrated an electromagnetically-deflected tube 70 having three sets of deflecting coils 71, 72, and 73 to give respectively a range scan, elevation scan and bearing scan as illustrated, and the appearance of the crossed planes is quite simply produced by alternately cutting off either the elevation scan or the bearing scan, as in the circuit shown, in which the elevation and bearing scan feeds to the amplifiers 74 and 75 and respective deflecting coils 72 and 73 are interrupted by switches or relay contacts 76 and 77 which are changed over to earth alternately by energisation of the windings of relays RL1 and RL2, for example by the multivibrator circuit 78 illustrated, in which the windings of relays RL1 and RL2 are shown connected in the anode circuits of a pair of thermionic valves 79 and 80 cross-connected in the normal multivibrator circuit (and having their control grids 81 and 82 taken to an adjustable tapping on the potentiometer 83 across the HT supply to enable the switching rate to be varied from say 2-30 changes per second) so that the relay windings are energised out of phase with each other. As each relay is energised, the inputs to the bearing and elevation amplifiers 74 and 75 are cut-off by being switched to earth, whereas the range scan continues uninterrupted so that in alternation there is either a range scan combined with an elevation scan producing the appearance of a vertical plane, or a bearing scan combined with the range scan to produce the appearance of a horizontal plane.

It will be appreciated that the invention can be employed for the display of any type of positional, numerical or like data not only for the display of the information derived from an object-locating and -detecting system but for the analysis of mathematical functions and for the demonstration for teaching purposes of such functions.

Numerous additional applications of the principles above-disclosed in the embodiments shown will occur to those skilled in the art and no attempt has been made to exhaust such possibilities. The scope of this invention is defined in the following claims.

We claim:

1. In apparatus of the class described for producing a cathode ray tube display, the combination of a cathode ray tube having deflecting elements and a luminescent screen, sweep circuits for producing three simultaneous independent time-base sweep voltages each as a function of a respective variable and including a bearing scan sweep generator, an elevation scan sweep generator and a range scan sweep generator, control circuits interconnecting said generators and said deflecting elements for applying the sweep voltages of said generators to said deflecting elements, and magnitude adjusting means in the control circuits so adjusting the magnitude of the components of the three sweep voltages applied to the deflecting elements as to cause the trace on the luminescent screen to simulate the perspective representation of three mutually perpendicular coordinates on the luminescent screen.

2. Apparatus according to claim 1 wherein reference marking circuits are provided for electronically producing within the representation reference indicia.

3. Apparatus according to claim 2 wherein a variable control is provided for said reference marker circuit, whereby said reference indicia are movable on the representation.

4. Apparatus according to claim 1 wherein a revolving shutter having alternate differently polarized filters is provided for modifying the view of said luminescent screen and wherein duplicate control circuits are provided together with a switch for connecting said duplicate control circuits alternately to said deflecting elements in synchronism with the changes in view of said luminescent screen produced by said revolving shutter, whereby when said luminescent screen is viewed through said revolving shutter by means of eyeglasses having the two lenses differently polarized in the same fashion as said alternate filters of the revolving shutter are polarized and each pair of duplicate control circuits is adjusted to suit the aspect of the representation desired and the normal eye separation distance and the viewing distance, a stereoptican representation is produced.

5. Apparatus according to claim 1 wherein a revolving shutter having alternate differently colored filters is provided for modifying the view of said luminescent screen and wherein duplicate control circuits are provided together with a switch for connecting said duplicate control circuits alternately to said deflecting elements in synchronism with the change in view of said luminescent screen produced by said revolving shutter, whereby when said luminescent screen is viewed through said revolving shutter by means of eyeglasses having the two lenses differently colored in the same fashion as said alternate filters of the revolving shutter are differently colored and each pair of duplicate control circuits is adjusted to suit the aspect of the representation desired and the normal eye separation distance and the viewing distance, a stereoptican representation is produced.

6. In apparatus of the class described for producing a cathode ray tube display, the combination of a cathode ray tube having deflecting elements, a control element, and a luminescent screen, sweep circuits for producing three simultaneous independent time-base sweep voltages each as a function of a respective variable and including a bearing scan sweep generator, an elevation scan sweep generator and a range scan sweep generator, control circuits interconnecting said generators and said deflecting elements for applying the sweep voltages of said generators to said deflecting elements, magnitude adjusting means in the control circuits so adjusting the magnitude of the components of the three sweep voltages applied to the deflecting elements as to cause the trace on the luminescent screen to simulate the perspective representation of three mutually perpendicular coordinates on the luminescent screen, and an intensity modulation circuit connected to the control element for intensity modulating the electron beam in accordance with the instantaneous values of any of the three variable quantities represented by the coordinates.

7. Apparatus according to claim 6 wherein said deflecting elements comprise two pairs of electrostatic deflection plates, said control circuits comprise a first and second resolving device, and two of the independent time-base voltages are fed in vectorial quadrature to the first resolving device, which resolves a voltage proportional to each input voltage into sine and co-sine components and produces a first output voltage, representing the sum of the sine component of one voltage and the co-sine component of the other voltage, which is fed to one pair of deflecting plates and a second output voltage, representing the sum of the corresponding co-sine and sine components, which is fed together with, and in vectorial quadrature to, the third independent time-base voltage to the second resolving device, which resolves a voltage proportional to the second output voltage into a sine component and a voltage proportional to the third independent time-base voltage into a co-sine component, the output voltage of said second resolving device representing the sum of the sine and co-sine components being fed to the other pair of deflecting plates.

8. Apparatus according to claim 7 wherein the second resolving device also resolves a voltage proportional to the second voltage into a co-sine component and a voltage proportional to the third independent time-base voltage into a sine component, an output voltage representing the sum of the co-sine and sine components being fed to said control element of the cathode ray tube to cause the nearer part of the three-coordinate representation thereby to appear most brilliantly with the intensity decreasing toward the rear of the representation.

9. Apparatus according to claim 7 wherein the cathode ray tube includes a sensitivity control element and the second resolving device also resolves a voltage proportional to the second voltage into a co-sine component and a voltage proportional to the third independent time-base voltage into a sine component, an output voltage representing the sum of the co-sine and sine components being fed to said sensitivity control element of the cathode ray tube to cause the representation to be shown in perspective.

10. Apparatus according to claim 6 wherein a control is provided for varying the relative positions of the representation on said luminescent screen of the three mutually perpendicular coordinates, whereby each face of the representation may be viewed independently at will.

11. Apparatus according to claim 6 wherein the cathode ray tube includes a sensitivity control element whereby perspective may be introduced into the representation by modulating said sensitivity control element of the cathode ray tube by a voltage which varies in proportion to the amount by which the three-coordinate representation would be distorted when viewed from a point source.

12. Apparatus according to claim 6 wherein said deflecting elements comprise three electromagnet deflection coils.

13. Apparatus according to claim 6 wherein a switch is provided for simultaneously interchanging two of said three independent time-base voltages with constant voltage sources for deflecting the electron beam, whereby a reference line is produced within the representation.

14. Apparatus according to claim 6 wherein a pulse delay circuit connected to said control element is provided for producing a pulse delayed a predetermined time after the start of one of said independent time-base voltages, whereby a range marker plane is produced on the representation, the position of said plane relative to the coordinate corresponding to said one independent time-base voltage being fixed by said predetermined time.

15. Apparatus according to claim 6 wherein two of the independent time-base voltages are fed to said cathode ray tube deflecting elements so as to produce a first oblique representation of two of the three mutually perpendicular coordinates and wherein a switch is provided for rapidly interchanging this representation with a second oblique representation of one of the said two mutually perpendicular coordinates and the third coordinate.

16. Apparatus according to claim 6 wherein two of the independent time-base voltages are fed to said cathode ray tube deflecting elements so as to produce a first oblique representation of two of the three mutually perpendicular coordinates and wherein a switch is provided for rapidly interchanging this representation with a second oblique representation of one of the said two mutually perpendicular coordinates and the third coordinate, and a control is provided for moving the second representation along the first representation transversely to the common coordinate thereof, the intensity modulations representing the instantaneous values of the three variable quantities being so gated that they appear on the second oblique representation only when that representation is in the correct position relative to the first oblique representation.

17. Apparatus according to claim 6 wherein two of the independent time-base voltages are fed to said cathode ray tube deflecting elements so as to produce a first oblique representation of two of the three mutually perpendicular coordinates, wherein a switch is provided for rapidly interchanging this representation with a second oblique representation of one of the said two mutually perpendicular coordinates and the third coordinate, wherein a revolving shutter having alternate differently colored filters is provided for modifying the view of said luminescent screen, and wherein said switch operates in synchronism with the changes in view of said luminescent screen produced by said revolving shutter, whereby when said luminescent screen is viewed through said revolving shutter, the two oblique representations appear in different colors and assist in visual differentiation therebetween.

18. Apparatus according to claim 6 wherein two of the independent time-base voltages are fed to the cathode ray tube so as to produce a composite oblique cruciform picture comprising a first oblique representation of two of the mutually perpendicular coordinates with a second oblique representation of one of the two said mutually perpendicular coordinates and the third coordinate, each intensity modulation representing the instantaneous value of the three variable quantities appearing on both oblique representations.

19. Apparatus according to claim 6 wherein reference marking circuits are provided for electronically producing within the representation reference indicia for the purpose of accurately measuring the position of intensity modulations within the representation.

20. Apparatus according to claim 6 wherein reference marking circuits are provided for electronically producing within the representation reference indicia for the purpose of accurately measuring the position of intensity modulations within the representation and wherein a variable control is provided for said reference marker circuit whereby said reference indicia are movable on the representation.

21. Apparatus according to claim 6 wherein said deflecting elements comprise electromagnetic deflection coils, said control circuits comprise a first and second resolving device, and two of the independent time-base voltages are fed in vectorial quadrature to the first resolving device, which resolves a voltage proportional to each input voltage into sine and co-sine components and produces a first output voltage, representing the sum of the sine component of one voltage and the co-sine component of the other voltage, which is fed to one of said deflection coils and a second output voltage, representing the sum of the corresponding co-sine and sine components, which is fed together with, and in vectorial quadrature to, the third independent time-base voltage to the second resolving device, which resolves a voltage proportional to the second output voltage into a sine component and a voltage proportional to the third independent time-base voltage into a co-sine component, the output voltage of said second resolving device representing the sum of the sine and co-sine components being fed to another of said deflection coils.

22. Apparatus according to claim 6 wherein said deflecting elements comprise two pairs of electrostatic deflection plates, said control circuits comprise a first and second resolving device, and two of the independent time-base voltages are fed in vectorial quadrature to the first resolving device, which resolves a voltage proportional to each input voltage into sine and co-sine components and produces a first output voltage, representing the sum of the sine component of one voltage and the co-sine component of the other voltage, which is fed to one pair of deflecting plates and a second output voltage, representing the sum of the corresponding co-sine and sine components, which is fed together with, and in vectorial quadrature to, the third independent time-base voltage to the second resolving device, which resolves a voltage proportional to the second output voltage into a sine component and a voltage proportional to the third independent time-base voltage into a co-sine component, the output voltage of said second resolving device representing the sum of the sine and co-sine components being fed to the other pair of deflecting plates and wherein the angular resolution of each resolving device is independently variable, whereby variation of the angular resolution of said resolving devices produces apparent rotation of said representation on the screen.

23. Apparatus according to claim 6 wherein said control circuits comprise a first and second variocoupler and two of the independent time-base voltages are fed in vectorial quadrature to the first variocoupler, which resolves a voltage proportional to each input voltage into sine and co-sine components and produces a first output voltage, representing the sum of the sine component of one voltage and the co-sine component of the other voltage, which is fed to one of said deflecting elements, and a second output voltage, representing the sum of the corresponding co-sine and sine components, which is fed together with, and in vectorial quadrature to, the third independent time-base voltage to the second variocoupler, which resolves a voltage proportional to the second output voltage into a sine component and a voltage proportional to the third independent time-base voltage into a co-sine component, the output voltage of said second variocoupler representing the sum of the sine and co-sine components being fed to another of said deflecting elements.

24. Apparatus according to claim 6 wherein said control circuits comprise a first and second sine/co-sine potential divider and two of the independent time-base voltages are fed in vectorial quadrature to the first sine/co-sine potential divider, which resolves a voltage proportional to each input voltage into sine and co-sine components and produces a first output voltage, representing the sum of the sine component of one voltage and the co-sine component of the other voltage, which is fed to one of said deflecting elements, and a second output voltage, representing the sum of the corresponding co-sine and sine components, which is fed together with, and in vectorial quadrature to, the third independent time-base voltage to the second sine/co-sine potential divider, which resolves a voltage proportional to the second output voltage into a sine component and a voltage proportional to the third independent time-base voltage into a co-sine component, the output voltage of said second sine/co-sine potential divider representing the sum of the sine and co-sine components being fed to another of said deflecting elements.

25. In apparatus of the class described for producing a cathode tube display, the combination of a cathode ray tube having deflecting elements, a control element, and a luminescent screen, sweep circuits for producing three simultaneous independent time-base sweep voltages each as a function of a respective variable, control circuits inter-connecting said sweep circuits and said deflecting elements for applying the sweep voltages of said sweep circuits to said deflecting elements, magnitude adjusting means in the control circuits so adjusting the magnitude of the components of the three sweep voltages applied to the deflecting elements as to cause the trace on the luminescent screen to simulate the perspective representation of three mutually perpendicular coordinates on the luminescent screen, and an intensity modulation circuit connected to the control element for intensity modulating the electron beam in accordance with the instantaneous values of any of the three variable quantities represented by the coordinates.

ERIC PARKER.
PETER R. WALLIS.
ALEXANDER WORONCOW.

References Cited in the file of this patent

UNITED STATES PATENTS

| Number | Name | Date |
| --- | --- | --- |
| 2,405,231 | Newhouse | Aug. 6, 1946 |
| 2,409,462 | Zworykin | Oct. 15, 1946 |
| 2,410,666 | Leck | Nov. 5, 1946 |
| 2,413,026 | Mason | Dec. 24, 1946 |
| 2,419,205 | Feldman | Apr. 22, 1947 |
| 2,419,567 | Labin | Apr. 29, 1947 |
| 2,421,747 | Englehardt | June 10, 1947 |
| 2,423,829 | Ferrell | July 15, 1947 |
| 2,426,189 | Espenschied | Aug. 26, 1947 |
| 2,426,979 | Ayres | Sept. 9, 1947 |
| 2,434,897 | Ayres | Jan. 27, 1948 |
| 2,440,250 | Deloraine | Apr. 27, 1948 |
| 2,448,016 | Busignies | Aug. 31, 1948 |
| 2,455,456 | Whitaker | Dec. 7, 1948 |
| 2,468,028 | Browning | Apr. 26, 1949 |
| 2,477,651 | Ranger | Aug. 2, 1949 |
| 2,480,208 | Alvarez | Aug. 30, 1949 |
| 2,531,466 | Ranger | Nov. 28, 1950 |
| 2,538,800 | Ranger | Jan. 23, 1951 |
| 2,547,945 | Jenks | Apr. 10, 1951 |
| 2,548,900 | Lester | Apr. 17, 1951 |